US012785913B2

(12) United States Patent
Gao

(10) Patent No.: US 12,785,913 B2
(45) Date of Patent: Nov. 3, 2026

(54) SRS SENDING METHOD AND APPARATUS FOR ANTENNA SWITCHING CONFIGURATION, AND STORAGE MEDIUM

(71) Applicant: Beijing Xiaomi Mobile Software Co., Ltd., Beijing (CN)

(72) Inventor: Xueyuan Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 289 days.

(21) Appl. No.: 18/694,324

(22) PCT Filed: Sep. 23, 2021

(86) PCT No.: PCT/CN2021/120014
§ 371 (c)(1),
(2) Date: Mar. 21, 2024

(87) PCT Pub. No.: WO2023/044686
PCT Pub. Date: Mar. 30, 2023

(65) Prior Publication Data

US 2024/0405958 A1 Dec. 5, 2024

(51) Int. Cl.
*H04L 5/00* (2006.01)
*H04B 7/06* (2006.01)

(52) U.S. Cl.
CPC ......... *H04L 5/0096* (2013.01); *H04B 7/0608* (2013.01); *H04L 5/0051* (2013.01)

(58) Field of Classification Search
CPC ............................ H04L 5/0096; H04B 7/0608
See application file for complete search history.

(56) References Cited

U.S. PATENT DOCUMENTS

2019/0253214 A1* 8/2019 Liu ...................... H04B 7/0413
2020/0252241 A1 8/2020 Park et al.
(Continued)

FOREIGN PATENT DOCUMENTS

CN 110650485 A 1/2020
CN 111262679 A 6/2020
(Continued)

OTHER PUBLICATIONS

Nokia, Nokia Shanghai Bell, "Enhancements on SRS in Rel-17," 3GPP TSG RAN WG1 #102, R1-2006848, e-meeting, Aug. 17-29, 2020, 4 pages.

(Continued)

*Primary Examiner* — Derrick V Rose
(74) *Attorney, Agent, or Firm* — Finnegan, Henderson, Farabow, Garrett & Dunner, L.L.P.

(57) ABSTRACT

An SRS transmission method for antenna switching configuration, is applied to a terminal and includes: obtaining indication information, the indication information indicating antenna switching configuration related information, and the antenna switching configuration related information including one or a combination of: a transmitting antenna used for an SRS corresponding to a target antenna switching configuration, a transmitting antenna port used for the SRS corresponding to the target antenna switching configuration, the target antenna switching configuration, and SRS resources corresponding to the target antenna switching configuration; determining, based on the indication information, a target SRS resource for sending the target antenna switching configuration; and sending the SRS corresponding to the target antenna switching configuration according to the target SRS resource.

12 Claims, 7 Drawing Sheets

(56) References Cited

U.S. PATENT DOCUMENTS

| | | | |
|---|---|---|---|
| 2021/0112498 A1 | 4/2021 | Duan et al. | |
| 2024/0048348 A1* | 2/2024 | Abdelghaffar | H04L 5/0023 |
| 2024/0171345 A1* | 5/2024 | Liu | H04L 5/0051 |

FOREIGN PATENT DOCUMENTS

| | | | |
|---|---|---|---|
| CN | 112564871 | A | 3/2021 |
| CN | 113242061 | A | 8/2021 |
| CN | 113300823 | A | 8/2021 |
| EP | 3975459 | A1 | 3/2022 |
| EP | 4092945 | A1 | 11/2022 |
| WO | 2021016827 | A1 | 2/2021 |
| WO | 2021035389 | A1 | 3/2021 |
| WO | 2021088822 | A1 | 5/2021 |
| WO | 2021143938 | A1 | 7/2021 |
| WO | 2021159452 | A1 | 8/2021 |

OTHER PUBLICATIONS

International Search Report of International Application No. PCT/CN2021/120014, dated Mar. 28, 2022, 4 pages.

Extended European Search Report Issued in Application No. 21957822.6 dated Nov. 25, 2024, 10 pages.

Office Action for IN Application No. 202427030320, dated Mar. 30, 2026.

Office Action for CN Application No. 202180002997.2, dated Jul. 22, 2025.

* cited by examiner

SRS SENDING METHOD AND APPARATUS FOR ANTENNA SWITCHING CONFIGURATION, AND STORAGE MEDIUM

CROSS-REFERENCE TO RELATED APPLICATIONS

The present application is a U.S. National Stage of International Application No. PCT/CN2021/120014, filed on Sep. 23, 2021, the disclosure of which is incorporated herein by reference in its entirety.

TECHNICAL FIELD

The present disclosure relates to the field of communication technology, and in particular, to an SRS transmission method and device for antenna switching configuration and a storage medium.

BACKGROUND

In order to support that downlink information can be effectively obtained through channels under various transceiving capabilities of terminals, different antenna switching configurations are set for the terminals in the communication system. Different antenna switching configurations correspond to different Sounding Reference Signals (SRSs).

In related arts, there is a strong demand for transmitting antenna switching (Tx switching) in order to adapt to business changes. For example, a terminal with 4T8R can achieve requirements such as power saving by turning off the transmitting antenna transmission chain (Tx chain), for example, by switching to 2T8R or 1T8R.

SUMMARY

According to a first aspect of embodiments of the present disclosure, an SRS transmission method for antenna switching configuration is provided, which is applied to a terminal, and the method includes:

obtaining indication information, the indication information being used to indicate antenna switching configuration related information, the antenna switching configuration related information includes one or a combination of the following: a transmitting antenna used for an SRS corresponding to a target antenna switching configuration, a transmitting antenna port used for the SRS corresponding to the target antenna switching configuration, the target antenna switching configuration, and a SRS resource corresponding to the target antenna switching configuration; determining, based on the indication information, a target SRS resource for sending the target antenna switching configuration; and transmitting the SRS of the target antenna switching configuration according to the target SRS resource.

According to the second aspect of the embodiments of the present disclosure, an SRS transmission method for antenna switching configuration is provided, which is applied to a network device, and the method includes:

transmitting indication information, the indication information being used to indicate antenna switching configuration related information, the antenna switching configuration related information includes one or a combination of the following: a transmitting antenna used for an SRS corresponding to a target antenna switching configuration, a transmitting antenna port used for the SRS corresponding to the target antenna switching configuration, the target antenna switching configuration, and a SRS resource corresponding to the target antenna switching configuration; and receiving the SRS of the target antenna switching configuration.

According to a third aspect of the embodiments of the present disclosure, a SRS transmitting device for antenna switching configuration is provided, including:

a obtaining unit, configured to obtain indication information, the indication information being used to indicate antenna switching configuration related information, the antenna switching configuration related information includes one or a combination of the following: a transmitting antenna used for an SRS corresponding to a target antenna switching configuration, a transmitting antenna port used for the SRS corresponding to the target antenna switching configuration, the target antenna switching configuration, and a SRS resource corresponding to the target antenna switching configuration; a processing unit, configured to determine, based on the indication information, a target SRS resource for sending the target antenna switching configuration; a sending unit, configured to transmit the SRS of the target antenna switching configuration according to the target SRS resource.

According to a fourth aspect of the embodiments of the present disclosure, an SRS transmission device for antenna switching configuration is provided, which is applied to a network device and includes:

a sending unit, configured to send indication information, the indication information being used to indicate antenna switching configuration related information, and the antenna switching configuration related information including one or a combination of the following: a transmitting antenna used for an SRS corresponding to a target antenna switching configuration, a transmitting antenna port used for the SRS corresponding to the target antenna switching configuration, the target antenna switching configuration, and a SRS resource corresponding to the target antenna switching configuration; and a receiving unit, configured to receive the SRS of the target antenna switching configuration.

According to a fifth aspect of the embodiments of the present disclosure, an SRS transmission device for antenna switching configuration is provided, including:

a processor; and a memory configured to store instructions executable by the processor;

wherein the processor is configured to perform the SRS transmission method for antenna switching configuration described in the first aspect or any implementation of the first aspect.

According to a sixth aspect of the embodiments of the present disclosure, an SRS transmission device for antenna switching configuration is provided, including:

a processor; and a memory configured to store instructions executable by the processor;

wherein the processor is configured to perform the SRS transmission method for antenna switching configuration described in the second aspect or any implementation of the second aspect.

According to a seventh aspect of the embodiments of the present disclosure, there is provided a storage medium having stored thereon instructions which, when being executed by a processor of a terminal, cause the terminal to perform the SRS transmission method for antenna switching configuration described in the first aspect or any implementation of the first aspect.

According to an eighth aspect of the embodiments of the present disclosure, there is provided a storage medium having stored thereon instructions which, when being executed by a processor of a network device, cause the network device to perform the SRS transmission method for antenna switching configuration described in the second aspect or any implementation of the second aspect.

It should be understood that the foregoing general description and the following detailed description are exemplary and explanatory only, and do not limit the present disclosure.

BRIEF DESCRIPTION OF THE DRAWINGS

The accompanying drawings, which are incorporated in and constitute a part of the description, illustrate embodiments consistent with the present disclosure and together with the description, serve to explain the principles of the present disclosure.

DETAILED DESCRIPTION

The illustrative embodiments will be described in detail herein, examples of which are illustrated in the accompanying drawings. When the following description refers to the drawings, the same numbers in different drawings refer to the same or similar elements unless otherwise indicated. The implementations described in the following illustrative embodiments do not represent all implementations consistent with the present disclosure. Rather, they are merely examples of devices and methods consistent with aspects of the present disclosure as detailed in the appended claims.

Figure 1:
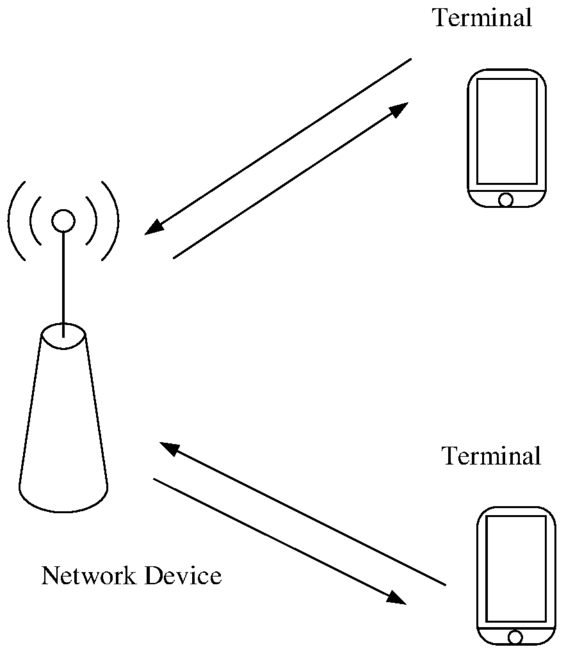
FIG. 1 is a schematic diagram of a wireless communication system according to an illustrative embodiment.

An SRS transmission method for antenna switching configuration provided by the embodiments of the present disclosure can be applied to a wireless communication system as shown in FIG. 1. Referring to FIG. 1, the wireless communication system includes a network device and terminals. The terminals are connected to the network device through wireless resources and perform data transmission.

It can be understood that the wireless communication system shown in FIG. 1 is only a schematic illustration, and the wireless communication system may also include other network devices, such as a core network device, a wireless relay device, a wireless backhaul device, etc. that are not shown in FIG. 1. The number of network devices and terminals included in the wireless communication system are not limited in the embodiments of the present disclosure.

It can be further understood that the wireless communication system in the embodiments of the present disclosure is a network that provides wireless communication functions. The wireless communication systems can use different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency division multiple access (single Carrier FDMA, SC-FDMA), and Carrier Sense Multiple Access with Collision Avoidance. Depending on factors such as capacities, speeds and delays of different networks, the networks can be divided into 2th generation (2G) network, 3G network, 4G network or future evolution networks, such as 5G network. The 5G network can also be referred to as a New Radio (NR) network. For convenience of description, the wireless communication network is sometimes referred to as simply a network in the present disclosure.

Furthermore, the network device involved in the present disclosure may also be called a wireless access network device. The wireless access network device may be a base station, an evolved base station (evolved node B), a home base station, an access point (AP) in a wireless fidelity (WI-FI) system, a wireless relay node, a wireless backhaul node, a transmission point (TP) or a transmission and reception point (TRP), etc., or may be a gNB in the NR system, or a component or part of the device that constitutes the base station. It should be understood that in the embodiments of the present disclosure, there are no limitations on the specific technologies and specific device forms used for the network device. In the present disclosure, the network device can provide communication coverage for a specific geographical area and can communicate with terminals located within the coverage area (a cell). In addition, when it is a vehicle-to-everything (V2X) communication system, the network device can also be a vehicle-mounted device.

Further, the terminal involved in the present disclosure may also be called a terminal device, User Equipment (UE), a mobile station (MS), a mobile terminal (MT), etc., which is a device that provides users with voice and/or data connectivity. For example, the terminal may be a handheld device, a vehicle-mounted device, etc. that has wireless connectivity capabilities. Currently, some examples of terminals are: Smartphones (Mobile Phones), Customer Premise Equipment (CPE), Pocket Personal Computers (PPCs), PDAs, Personal Digital Assistants (PDAs), laptops, tablets, wearable devices, or vehicle-mounted devices, etc. In addition, when it is a vehicle-to-everything (V2X) communication system, the terminal device can also be a vehicle-mounted device. It should be understood that in the embodiments of the present disclosure, there are no limitations on the specific technologies and specific device forms used for the terminal.

In the related art, multiple transmitting antennas and receiving antennas are used at the transmitting end and the receiving end respectively, so that signals are transmitted and received through the multiple antennas at the transmitting end and the receiving end. By achieving multiple transmissions and multiple receptions through multiple antennas, the system channel capacity can be increased in multiple and data throughput and signal-to-noise ratio and be improved without increasing spectrum resources and antenna transmission power, thus improving system performance and communication quality.

In order to support that downlink information can be effectively obtained through channels under various transceiving capabilities of terminals, different antenna switching configurations are set for the terminals in the communication system. The antenna switching capability of the terminal defined by R15/16 can be divided into the same number of receiving antennas and of transmitting antennas (i.e., T=R), and the number of the receiving antennas being greater than the number of the transmitting antennas (i.e., R>T). In related art, in the case of T=R currently supported by the protocol, the terminal antenna switching capabilities mainly include one transmitting antenna and one receiving antenna (1T1R), two transmitting antennas and two receiving antennas (2T2R), and four transmitting antennas and four receiving antennas (4T4R). For R>T, i.e., more receiving antennas than the transmitting antennas, it includes the following cases: one transmitting antennas and two receiving antennas (1T2R), one transmitting antennas and four receiving antennas (1T4R), and two transmitting antennas and four receiving antennas (2T4R).

In R15, the antenna switching capabilities supported by terminals include 1T2R, 1T4R, 2T4R, 1T4R-2T4R, 1T1R, 2T2R, and 4T4R.

In R16, the antenna switching capabilities supported by terminals include 1T1R-1T2R, 1T1R-1T2R-1T4R, 1T1R-1T2R-2T2R-2T4R, 1T1R-1T2R-2T2R-1T4R-2T4R, 1T1R-2T2R, and 1T1R-2T2R-4T4R.

In the current research of R17, it is considered that there is a need to further increase the number of antennas in the terminal, so the number of antennas will be further increased to a maximum of 6 antennas or a maximum of 8 antennas. The typical antenna configuration currently defined is {1T6R, 1T8R, 2T6R, 2T8R, [4T6R], 4T8R}, as shown in Table 1 below:

TABLE 1

| SRS antenna switching combinations up to 8 antennas | | |
|---|---|---|
| Tx\Rx | 6Rx | 8Rx |
| 1T | 1T6R | 1T8R |
| 2T | 2T6R | 2T8R |
| 4T | 4T6R | 4T8R |

In the related art, a Sounding Reference Signal (SRS) for antenna switching configuration is configured, and different antenna switching configurations correspond to different SRSs. There are the following situations for the SRS for the antenna switching configuration supported in the current protocol:

(1) For the terminal with the same number of transmitting and receiving antennas (T=R), the network device can configure up to two SRS resource sets, and in one set there is only one SRS resource in which the number of ports is equal to the number of transmitting antennas of the terminal. One of the two SRS resource sets can be configured as periodic, and the other one can be configured as aperiodic.

(2) For the terminal with capabilities of one transmitting antenna and two receiving antennas (1T2R), the network device can configure up to two SRS resource sets, there are two SRS resources in one set, and each SRS resource has only one port.

(3) For the terminal with capabilities of two transmitting antennas and four receiving antennas (2T4R), the network device can configure up to two SRS resource sets, there are two SRS resources in one set, and each SRS resource has two ports.

(4) For the terminal with capabilities of one transmitting antenna and four receiving antennas (1T4R), the network device requires special consideration when configuring the SRS resources. For the periodic or semi-persistent SRS resources, it can only configure at most one resource set in which four SRS resources each have one port; and for aperiodic SRS resources, it can configure up to two SRS resource sets, and there are a total of four SRS resources in the two SRS resource sets, and these four resources are sent in two slots and are sent by different physical antennas. For the two resource sets, each set can be configured with two resources, or one set can be configured with one resource and the other set can be configured with three resources, with each resource having only one port.

In the 5G NR system, triggering of the SRS resources may include periodic/semi-persistent/aperiodic SRS resource configuration triggering mechanisms.

For the periodic SRS (P-SRS), all parameters thereof are configured by higher layer signaling, and after being configured by the higher layer signaling, the P-SRS are sent periodically by the terminal according to the configured parameters. For the semi-persistent SRS (SP-SRS), all parameters thereof are also configured by higher layer signaling, and difference from the periodic sounding reference signal (SRS), although the corresponding parameters have been configured, the terminal cannot send the SP-SRS before receiving an activation command. Once the SP-SRS is activated, the terminal starts sending the SP-SRS, and stops sending the SP-SRS until it receives a deactivation command sent by the network device. The activation and deactivation commands for the SP-SRS are sent by a MAC layer, that is, through a MAC CE command.

The aperiodic SRS resources (AP-SRS) are triggered by a SRS request in Downlink Control Information (DCI). Table 2 shows the specific triggering signaling.

TABLE 2

| Value of SRS request field | Triggered aperiodic SRS resource set (s) for DCI format 0_1, 0_2, 1_1, 1_2, and 2_3 configured with higher layer parameter srs-TPC-PDCCH-Group set to 'typeB' | Triggered aperiodic SRS resource set (s) for DCI format 2_3 configured with higher layer parameter srs-TPC-PDCCH-Group set to 'typeA' |
|---|---|---|
| 00 | No aperiodic SRS resource set triggered | No aperiodic SRS resource set triggered |
| 01 | SRS resource set(s) configured by SRS-ResourceSet with higher layer parameter aperiodicSRS-ResourceTrigger set to 1 or an entry in aperiodicSRS-ResourceTriggerList set to 1 SRS resource set(s) configured by SRS-PosResourceSet with an entry in aperiodicSRS-ResourceTriggerList set to 1 when triggered by DCI formats 0_1, 0_2, 1_1, and 1_2 | SRS resource set(s) configured with higher layer parameter usage in SRS- Re s source Set set to 'antennaSwitching' and resourceType in SRS-ResourceSet set to 'aperiodic' for a 1$^{st}$ set of serving cells configured by higher layers |
| 10 | SRS resource set(s) configured by SRS-ResourceSet with higher layer parameter aperiodicSRS-ResourceTrigger set to 2 or an entry in aperiodicSRS-ResourceTriggerList set to 2 SRS resource set(s) configured by SRS-PosResourceSet with an entry in aperiodicSRS-ResourceTriggerList set to 2 when triggered by DCI formats 0_1, 0_2, 1_1, and 1_2 | SRS resource set(s) configured with higher layer parameter usage in SRS- Re s source Set set to 'antennaSwitching' and resourceType in SRS-ResourceSet set to 'aperiodic' for a 2$^{nd}$ set of serving cells configured by higher layers |
| 11 | SRS resource set(s) configured by SRS-ResourceSet with higher layer parameter aperiodicSRS-ResourceTrigger set to 3 or an entry in aperiodicSRS-ResourceTriggerList set to 3 SRS resource set(s) configured by SRS-PosResourceSet with an entry in aperiodicSRS-ResourceTriggerList set to 3 when triggered by DCI formats 0_1, 0_2, 1_1, and 1_2 | SRS resource set(s) configured with higher layer parameter usage in SRS- Re s source Set set to 'antennaSwitching' and resourceType in SRS-ResourceSet set to 'periodic' for a 3rd $^{set}$ of serving cells configured by higher layers |

Figure 2:
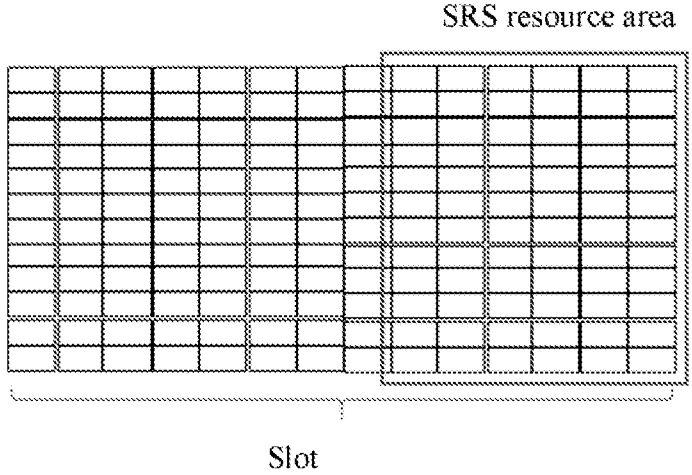
FIG. 2 is a schematic diagram showing an SRS mapping area within a slot according to an illustrative embodiment.

The uplink SRS may be a periodic SRS, a semi-persistent SRS or an aperiodic SRS, may be narrowband or wideband, and may have a single port or multiple ports. The uplink SRS parameters are configured by the network device for the terminal, and include the number of ports, frequency-domain resource positions, time-domain resource positions, sequences, sequence cyclic shift, etc. In the 5G NR system, SRS is mapped onto at most six symbols of an uplink slot, as shown in FIG. 2, which shows the SRS mapping area within the slot.

The network device can configure multiple uplink SRS resource sets for the terminal, and one resource set includes one or more SRS resources. One SRS resource can be on N consecutive OFDM symbols, and N can occupy 1, 2, or 4 symbols.

In the R15/16NR system, it supports that the network device such as a base station obtains downlink channel information through channel reciprocity so to improve downlink data transmission performance. In order to support gNB to effectively obtain the downlink information through the channel reciprocity under various transceiving capabilities of the terminals, the SRS reference signal is specially designed in the NR system.

Furthermore, in order to adapt to the current business or scenarios, the terminal may need to change the antenna configuration, for example, reduce from 2T4R to 1T4R or 2T2R, or change from 2T2R to 4T4R. In these cases, the antenna switching configuration needs to be switched. Therefore, it is necessary to consider technical solutions for rescheduling in switching of Tx antenna switching configuration.

In the switching of the antenna switching configuration of the terminal, the following antenna switching capabilities are supported:

Transmitter switching (Tx switching): the transmitting antenna/transmitting antenna port is dynamically switched, but the receiving antenna/receiving antenna port does not change. That is, it switches from xTyR to zTyR, x being not equal to z. For example, a 4T4R terminal switches to 2T4R or 1T4R.

Receiver switching (Rx switching): the receiving antenna/receiving antenna port is dynamically switched, but the transmitting antenna/transmitting antenna port does not change. That is, it switches from xTyR to xTzR, y being not equal to z. For example, a 1T4R terminal switches to 1T2R or 1T1R.

Tx switching/Rx switching: dynamic switching of transmitting antenna/transmitting antenna port and dynamic switching of receiving antenna/receiving antenna port are supported at the same time, that is, it switches from xTyR to x'Ty'R, which allows both x, y to be not equal to x', y'. For example, a 4T4R terminal switches to 1T2R or 1T1R.

In the SRS enhancement of R17, the number of the receiving antennas of the terminal will increase to 6/8, and there are more scenarios where the antenna switching is required, and there is a stronger demand for dynamic changes in the antenna switching configurations. Different switching methods have different requirements on the terminal and have different impacts on the terminal and the network. For terminals, considering different configurations, currently the main consideration is to support dynamic switching in Rx antenna/port switching. For example, it may support the 1T4R terminal to fallback to 1T2R or 1T1R.

However, for terminals, there is also a strong demand for Tx switching. For example, the 4T8R terminal can turn off the transmitting chain (Tx chain) to meet requirements such as power saving, and can switch to 2T8R or 1T8R. Therefore, it is also necessary to consider the implementation of transmitting antenna/transmitting port switching.

Embodiments of the present disclosure provide an SRS transmission method for antenna switching configuration. A target SRS resource for sending a target antenna switching configuration is determined through indication information that indicates relevant information of the target antenna switching configuration, and the SRS of the target antenna switching configuration is sent according to the target SRS resource, realizing dynamic switching of the antenna switching configuration.

Figure 3:
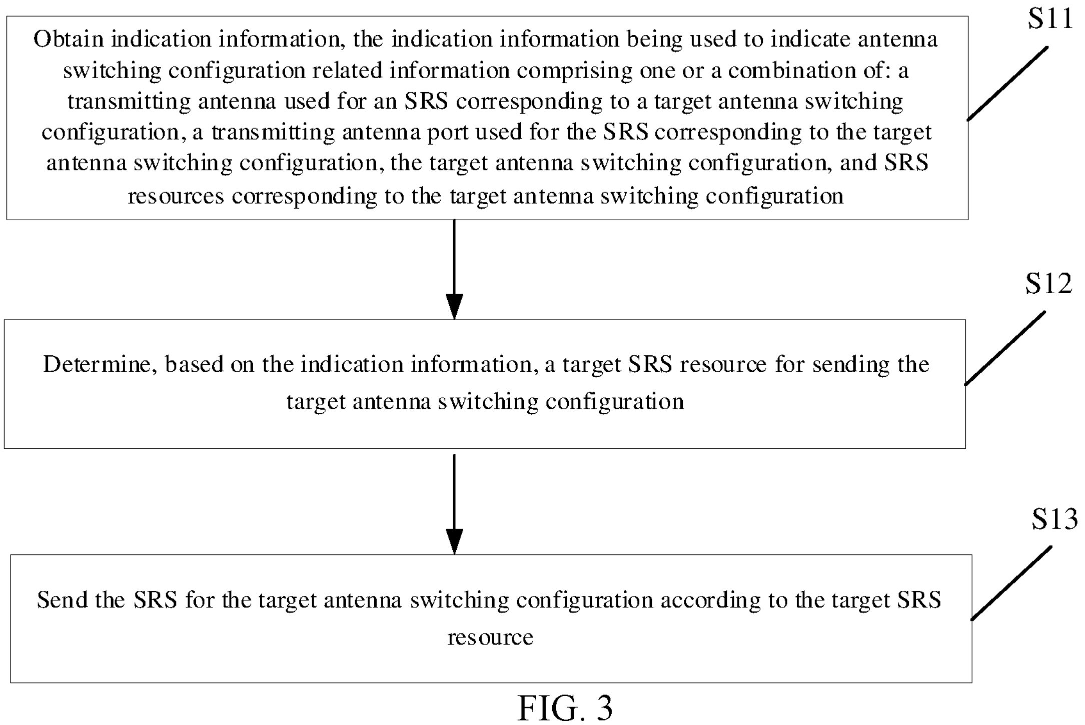
FIG. 3 is a flow chart of an SRS transmission method for antenna switching configuration according to an illustrative embodiment.

FIG. 3 is a flow chart of an SRS transmission method for antenna switching configuration according to an illustrative embodiment. As shown in FIG. 3, the SRS transmission method for antenna switching configuration is applied to a terminal and includes the following steps.

In step S11, indication information is obtained, the indication information being used to indicate antenna switching configuration related information, the antenna switching configuration related information includes one or a combination of the following: a transmitting antenna used for an SRS corresponding to a target antenna switching configuration, a transmitting antenna port used for the SRS corresponding to the target antenna switching configuration, the target antenna switching configuration, and SRS resources corresponding to the target antenna switching configuration.

In step S12, a target SRS resource for sending the target antenna switching configuration is determined based on the indication information.

In step S13, the SRS of the target antenna switching configuration is sent according to the target SRS resource.

In an embodiment of the present disclosure, the indication information used to indicate the antenna switching configuration related information can be understood as a newly introduced indicator signaling (indicator) used to indicate the SRS corresponding to the antenna switching configuration used for transmitting antenna/transmitting antenna port switching. Alternatively, the indication information can also be understood as change indication indicating a change in the SRS corresponding to the antenna switching configuration used for the transmitting antenna/transmitting antenna port switching.

The indication information used to indicate the antenna switching configuration related information in an embodiment of the present disclosure may include at least one of the following:

a media access control-control element (MAC CE), downlink control information (DCI), grant controller downlink control information (grant controller-DCI, GC-DCI) and Radio Resource Control (RRC) information.

Further, in an embodiment of the present disclosure, the SRS corresponding to the target antenna switching configuration includes one or more of a periodic SRS, an aperiodic SRS and a semi-persistent SRS.

In an embodiment of the present disclosure, the network device may indicate the terminal to send the SRS for antenna switching configuration based on different SRS resource sets.

In an implementation of the present disclosure, the network configures multiple SRS resource sets corresponding to different antenna switching configurations for the terminal, which are hereinafter referred to as first SRS resource sets. The terminal may determine a target SRS resource set in the first SRS resource sets, and determine the target SRS resource for sending the target antenna switching configuration in the target SRS resource set based on the indication information. The target SRS resource set includes one or more SRS resources corresponding to the antenna switching configuration supported by the terminal. The SRS resource set corresponding to each of the antenna switching configurations includes one or more first SRS resources.

In a case where the network configures multiple first SRS resource sets corresponding to different antenna switching configurations for the terminal, the network can indicate, through the indication information, the terminal to perform upward/downward adjustment based on the current antenna switching configuration among multiple antenna switching capabilities that are reported and supported by the terminal.

In the embodiments of the present disclosure, it may indicate the target antenna switching configuration based on the antenna switching capabilities supported by the terminal.

In an implementation, the antenna switching capabilities supported by the terminal is that the transmitting antenna switching is supported but the receiving antenna switching is not supported, and the indication information may indicate to adjust the current antenna switching configuration to the target transmitting antenna or the target transmitting antenna port used for the SRS corresponding to the target antenna switching configuration. In an example, for the terminal that supports Tx switching, the adjustment status of the Tx support port is indicated. For example, it supports transmission on one port, two ports and four ports, and the terminal currently uses two ports for transmission. If the indication information indicates 1, it switched to four port transmission, and if the indication information indicates 0, it switches to one port transmission, which actually corresponds to the adjustment of the antenna switching configuration.

It can be understood that the transmitting antenna indicated by the indication information in the embodiments of the present disclosure may include one transmitting antenna, or may include a combination of multiple transmitting antennas. The transmitting antenna port indicated by the indication information in the embodiments of the present disclosure may include one transmitting antenna port, or may include a combination of multiple transmitting antenna ports.

In another implementation, the antenna switching capability supported by the terminal is that switching of transmitting antennas and/or receiving antennas is supported, and the indication information may include at least one of the following manners:

Manner 1: the indication information indicates the target transmitting antenna or target transmitting antenna port used for the SRS corresponding to the target antenna switching configuration.

In an example, it indicates the adjustment of the antenna transmission port supported by Tx, and the corresponding Rx remains unchanged.

Manner 2: the indication information indicates the target antenna switching configuration.

In an example, it indicate the antenna switching configuration supported by the terminal. Tx/Rx can be both changed. For example, a terminal that supports the t1r-t2r2-t4r4 antenna switching capability is currently configured as t2r2 and adjustment can be indicated through signaling. For example, if it indicates 1, it is adjusted to the antenna switching configuration corresponding to 4T.

In the SRS transmission method for antenna switching configuration provided in the embodiments of the present disclosure, the indication information can be used to indicate that the SRS corresponding to the target antenna switching configuration takes effect, or the network scheduling can be used to indicate that the SRS corresponding to the target antenna switching configuration takes effect or indicate to switch a BWP, so that the terminal sends the SRS corresponding to the target antenna switching configuration. In an embodiment of the present disclosure, the terminal sends the SRS corresponding to the target antenna switching configuration by:

activating and sending the SRS corresponding to the target antenna switching configuration; or determining and sending the SRS resources corresponding to the target antenna switching configuration based on received RRC signaling; or switching to a bandwidth part including the target SRS resource, and sending the SRS corresponding to the target antenna switching configuration.

Further, in an embodiment of the present disclosure, the terminal can also report antenna switching configuration information, so that the network device can indicate relevant information of the target antenna switching configuration based on the antenna switching configuration information reported by the terminal.

In an implementation, the antenna switching configuration information reported by the terminal is used to indicate one or a combination of the following:

a target antenna switching configuration expected by the terminal; a transmitting antenna configuration or transmitting antenna port configuration expected by the terminal; and a SRS resource configuration expected by the terminal.

In an embodiment of the present disclosure, when the terminal reports the antenna switching configuration information, it may report the antenna switching configuration information based on at least one of a MAC CE, Uplink Control Information (UCI), grant controller uplink control information (grant Controller-UCI, GC-UCI) and a RRC message.

It can be understood that the above-mentioned embodiments of the present disclosure for sending the SRS of the antenna switching configuration based on the first SRS resource sets configured by the network can be performed separately, or can be performed in a combination of one or more embodiments.

Figure 4:
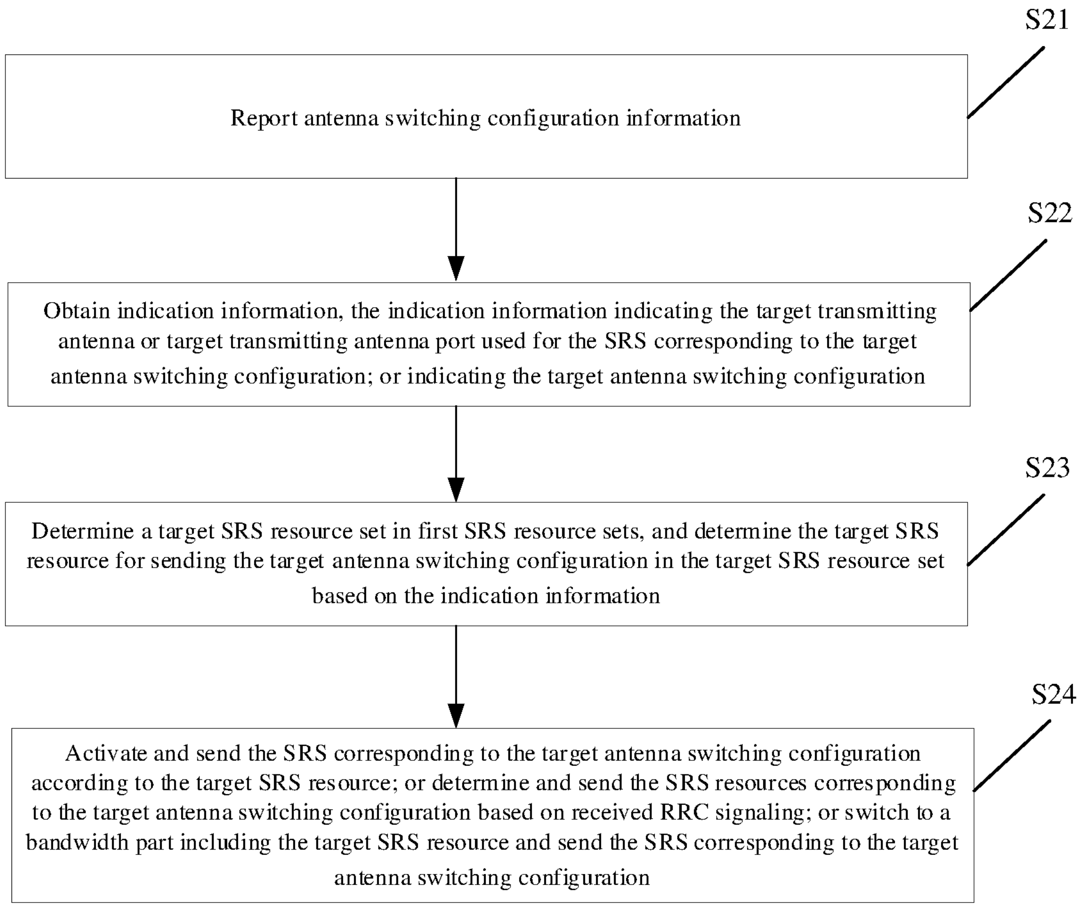
FIG. 4 is a flow chart of an SRS transmission method for antenna switching configuration according to an illustrative embodiment.

FIG. 4 is a flow chart of an SRS transmission method for antenna switching configuration according to an illustrative embodiment. As shown in FIG. 4, the SRS transmission method for antenna switching configuration is applied to a terminal and includes the following steps.

In step S21, antenna switching configuration information is reported.

In step S22, indication information is obtained, the indication information indicates a target transmitting antenna or target transmitting antenna port used for a SRS corresponding to a target antenna switching configuration; or the indication information indicates the target antenna switching configuration.

In an implementation, the terminal is a terminal that supports switching of the transmitting antennas, and the indication information is used to indicate to adjust the current antenna switching configuration to the target transmitting antenna or target transmitting antenna port used for the SRS corresponding to the target antenna switching configuration.

In another implementation, the terminal is a terminal that supports switching of the transmitting antennas and/or receiving antennas, and the indication information indicates the target transmitting antenna or target transmitting antenna port used for the SRS corresponding to the target antenna switching configuration; or the indication information indicates the target antenna switching configuration.

It can be understood that in the embodiments of the present disclosure, the target antenna switching configuration related information indicated by the indication information obtained by the terminal may be determined based on the antenna switching configuration information reported by the terminal in step S21.

It can be further understood that step S21 is an optional step in the embodiments of the present disclosure.

In step S23, a target SRS resource set is determined in the first SRS resource sets, and target SRS resources for sending the target antenna switching configuration are determined in the target SRS resource set based on the indication information.

In step S24, the SRS corresponding to the target antenna switching configuration is activated and sent according to the target SRS resources; or the SRS resources corresponding to the target antenna switching configuration are determined and sent based on received RRC signaling; or it switched to a bandwidth part including the target SRS resources and the SRS corresponding to the target antenna switching configuration is sent.

In the SRS transmission method for antenna switching configuration provided in the embodiments of the present disclosure, it realizes SRS configuration switching of the transmitting antennas/transmitting antenna ports, thereby realizing dynamic switching of the transmitter antenna switching configuration.

In another implementation of the present disclosure, the network configures, for the terminal, a set of SRS resources corresponding to the antenna switching configurations including all the transmitting antennas or transmitting ports supported by the terminal, or the network configures, for the terminal, a set of SRS resources corresponding to multiple different antenna switching configurations supported by the terminal, which is hereinafter referred to as a second SRS resource set.

In an example, the network can configure an SRS resource set that includes SRS resources corresponding to all Tx chains. Or the network may configure a SRS resource set that includes SRS resources corresponding to multiple different antenna switching configurations.

The terminal determines a target SRS resource set in the second SRS resource set. The second SRS resource set is a set of SRS resources corresponding to the antenna switching configurations including all transmitting antennas or transmitting ports supported by the terminal, or the second SRS resource set is a set of SRS resources corresponding to multiple different antenna switching configurations supported by the terminal. The terminal determines the target SRS resource for sending the target antenna switching configuration in the target SRS resource set based on the indication information.

In an embodiment of the present disclosure, in the case where the network configures the second SRS resource set, in one aspect, the indication information may be used to indicate the target transmitting antenna or target transmitting antenna port used for the SRS corresponding to the target antenna switching configuration, and in another aspect, the indication information may be used to indicate SRS resources corresponding to the target antenna switching configuration, where the SRS resources belong to one or more SRS resource sets.

In an implementation, the indication information is used to indicate the target transmitting antenna or target transmitting antenna port used for the SRS corresponding to the target antenna switching configuration. It can also be understood that the indication information indicates the specific port of the Tx antenna/Tx antenna port that the terminal currently needs to switch to.

The indication information may be used to indicate at least one of a bitmap, an index and a codepoint that correspond to the target transmitting antenna. Or the indication information may be used to indicate at least one of a bitmap, an index and a codepoint that correspond to the target transmitting antenna port. For example, it indicates the bitmap of the activated target transmitting antenna/target transmitting antenna port, or indicates the index corresponding to the target transmitting antenna/target transmitting antenna port, or the codepoint of the activated target transmitting antenna/target transmitting antenna port combination.

In another implementation, the indication information is used to indicate SRS resources corresponding to the target antenna switching configuration. It can also be understood that the indication information indicates the SRS resources corresponding to the Tx antenna/Tx antenna port that the terminal currently needs to switch to.

The indication information may be used to indicate at least one of a Bitmap, an index and a codepoint that correspond to the SRS resources corresponding to the target antenna switching configuration. For example, it indicates the Bitmap of the activated SRS resources corresponding to the target antenna switching configuration, or indicate the indexes of the SRS resources corresponding to the target antenna switching configuration, or the codepoint of the activated SRS resource combination corresponding to the target antenna switching configuration.

In the SRS transmitting method for antenna switching configuration provided in the embodiments of the present disclosure, partial SRS resources in the second SRS resource set can be activated, or the SRS resource sets for partial antenna switching configurations in the multiple antenna switching configurations can be activated. Alternatively, the network scheduling may indicate the SRS corresponding to the target antenna switching configuration to take effect or indicate to switch the BWP, so that the terminal sends the SRS corresponding to the target antenna switching configuration. In the embodiments of the present disclosure, the terminal sending the SRS corresponding to the target antenna switching configuration may include the following manners:

activating and sending the SRS resource set corresponding to the target antenna switching configuration, or determining and sending the SRS resources corresponding to the target antenna switching configuration based on the received RRC signaling, or switching to the bandwidth part including the target SRS resource and sending the SRS corresponding to the target antenna switching configuration.

Further, in an embodiment of the present disclosure, the terminal can also report antenna switching configuration information, so that the network device can indicate the target antenna switching configuration related information based on the antenna switching configuration information reported by the terminal.

In an implementation, the antenna switching configuration information reported by the terminal is used to indicate one or a combination of the following:

a target antenna switching configuration expected by the terminal; a transmitting antenna configuration or transmitting antenna port configuration expected by the terminal; and a SRS resource configuration expected by the terminal.

In an embodiment of the present disclosure, when the terminal reports the antenna switching configuration information, the terminal may report the antenna switching configuration information based on at least one of a MAC CE, UCI, GC-DCI and a RRC message.

It can be understood that the above-mentioned embodiments of the present disclosure for sending the SRS of the antenna switching configuration based on the second SRS resource set configured by the network can be performed separately, or can be performed in a combination of one or more embodiments.

Figure 5:
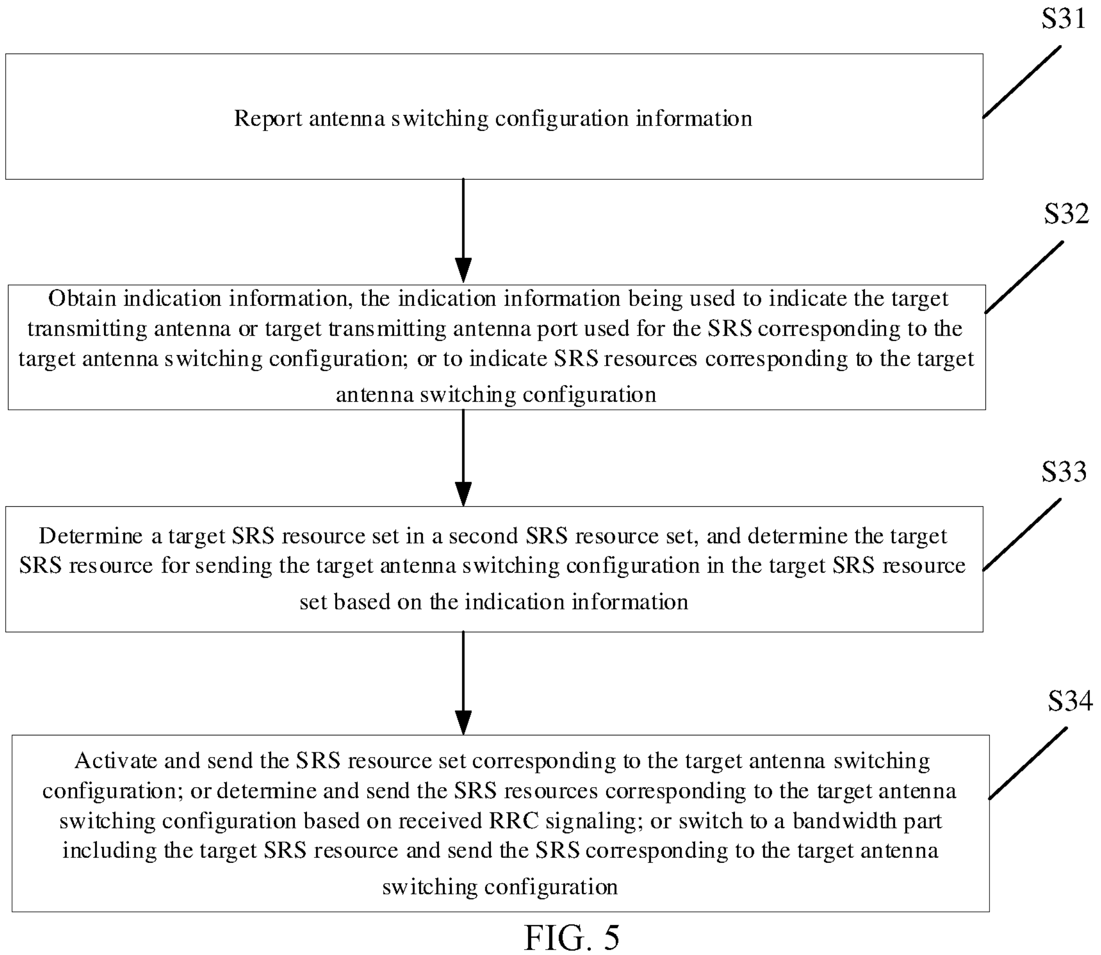
FIG. 5 is a flow chart of an SRS transmission method for antenna switching configuration according to an illustrative embodiment.

FIG. 5 is a flow chart of an SRS transmission method for antenna switching configuration according to an illustrative embodiment. As shown in FIG. 5, the SRS transmission method for antenna switching configuration is applied to a terminal and includes the following steps.

In step S31, antenna switching configuration information is reported.

In step S32, indication information is obtained, the indication information is used to indicate a target transmitting antenna or a target transmitting antenna port used for a SRS corresponding to a target antenna switching configuration, or the indication information is used to indicate SRS resources corresponding to the target antenna switching configuration.

In step S33, a target SRS resource set is determined in a second SRS resource set, and a target SRS resource for sending the target antenna switching configuration is determined in the target SRS resource set based on the indication information.

In step S34, the SRS resource set corresponding to the target antenna switching configuration is activated and sent, or the SRS resources corresponding to the target antenna switching configuration are determined and sent based on received RRC signaling, or it switched to a bandwidth part including the target SRS resource and SRS corresponding to the target antenna switching configuration is sent.

In the SRS transmission method for antenna switching configuration provided in the embodiments of the present disclosure, it realizes SRS configuration switching of the transmitting antenna/transmitting antenna port, thereby realizing dynamic switching of the transmitter antenna switching configuration. Moreover, by way of the second resource set, system signaling overhead can be saved.

Based on the same concept, the embodiments of the present disclosure also provide an SRS transmission method for antenna switching configuration that is applied to a network device.

Figure 6:
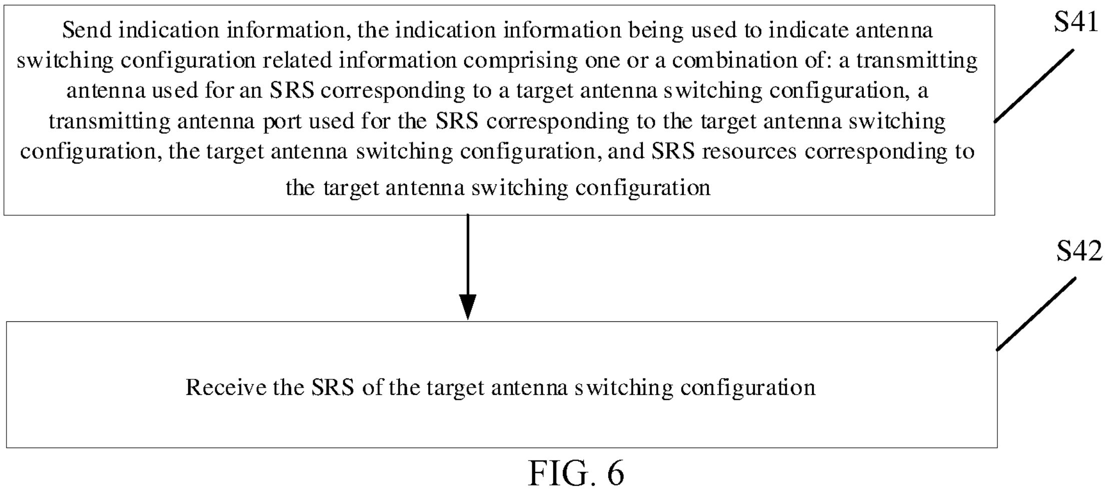
FIG. 6 is a flow chart of an SRS transmission method for antenna switching configuration according to an illustrative embodiment.

FIG. 6 is a flow chart of an SRS transmission method for antenna switching configuration according to an illustrative embodiment. As shown in FIG. 6, the SRS transmission method for the antenna switching configuration is applied to a network device and includes the following step.

In step S41, indication information is sent.

The indication information is used to indicate antenna switching configuration related information, and the antenna switching configuration related information includes one or a combination of the following: a transmitting antenna used for an SRS corresponding to a target antenna switching configuration, a transmitting antenna port used for the SRS corresponding to the target antenna switching configuration, the target antenna switching configuration, and SRS resources corresponding to the target antenna switching configuration.

In step S42, the SRS of the target antenna switching configuration is received.

In an implementation, the indication information indicates to adjust a current antenna switching configuration to the target transmitting antenna or target transmitting antenna port used for the SRS corresponding to the target antenna switching configuration. This is applicable in the situation where multiple first SRS resource sets corresponding to different antenna switching configurations are configured for the terminal, and the antenna switching capability supported by the terminal is that transmitting antenna switching is supported but receiving antenna switching is not supported.

In an implementation, the indication information indicates the target transmitting antenna or target transmitting antenna port used for the SRS corresponding to the target antenna switching configuration; or the indication information indicates the target antenna switching configuration. This is applicable in the situation where multiple first SRS resource sets corresponding to different antenna switching configurations are configured for the terminal, and the antenna switching capability supported by the terminal is that transmitting antenna and/or receiving antenna switching is supported.

In an implementation, the indication information is used to indicate the target transmitting antenna or target transmitting antenna port used for the SRS corresponding to the target antenna switching configuration. This is applicable in the situation where a second SRS resource set is configured for the terminal.

The indication information includes at least one of a bitmap, an index and a codepoint that correspond to the target transmitting antenna or the target transmitting antenna port.

In an implementation, the indication information indicates SRS resources corresponding to the target antenna switching configuration, where the SRS resources belong to one or more SRS resource sets. This is applicable in the situation where the second SRS resource set is configured for the terminal. The indication information includes at least one of a bitmap, an index and a codepoint corresponding to the SRS resources corresponding to the target antenna switching configuration.

In an implementation, the network device in the embodiments of the present disclosure may also send RRC signaling, which indicates the SRS resources corresponding to the target antenna switching configuration.

In an implementation, the method further includes: obtaining antenna switching configuration information reported by the terminal, where the antenna switching configuration information is used to indicate one or a combination of the following:

a target antenna switching configuration expected by the terminal; a transmitting antenna configuration or transmitting antenna port configuration expected by the terminal; and a SRS resource configuration expected by the terminal.

The indication information used to indicate antenna switching configuration related information in the embodiments of the present disclosure may include at least one of the following: MAC CE, DCI, GC-DCI and RRC.

In an implementation, the network device may also obtain the antenna switching configuration information reported by the terminal. For example, the antenna switching configuration information reported by the terminal is obtained based on at least one of MAC CE, UCI, GC-UCI and a RRC message.

In the embodiments of the present disclosure, the SRS corresponding to the target antenna switching configuration includes one or more of a periodic SRS, an aperiodic SRS, and a semi-persistent SRS.

It can be understood that some contents involved in implementing the SRS transmission for antenna switching configuration by the network device in the embodiments of the present disclosure are similar to the process of performing the SRS transmission for antenna switching configuration by the terminal, and will not be detailed here in the embodiments of the present disclosure. For those that are not detailed here, reference can be made to the description of the switching process of the antenna switching configuration on the terminal side.

According to the SRS transmission method for antenna switching configuration provided in the embodiments of the present disclosure, the network device can indicate to the terminal the antenna switching configuration related information to assist the terminal in switching the antenna switching configuration.

It can be further understood that the SRS transmission method for antenna switching configuration provided in the embodiments of the present disclosure is suitable for the situation where the terminal and the network device interact with each other to implement transmission of the SRS for the antenna switching configuration. During process of the terminal and the network device interacting for implementing the SRS transmission for the antenna switching configuration, the terminal has the function of implementing the terminal involved in the above embodiments, and the network device has the function of implementing the network device involved in the above embodiment. For details, reference can be made to the related description of the above embodiments, which will not be detailed here.

It should be noted that those skilled in the art can understand that the various implementations/embodiments mentioned above in the embodiments of the present disclosure can be used in conjunction with the foregoing embodiments or can be used independently. Whether used alone or in conjunction with the foregoing embodiments, the implementation principles are similar. In the embodiments of the present disclosure, some of the embodiments are described in terms of implementations used together. Of course, those skilled in the art can understand that such illustrations do not limit the embodiments of the present disclosure.

Based on the same concept, the embodiments of the present disclosure also provide an SRS transmission device for antenna switching configuration.

It can be understood that, in order to implement the above functions, the SRS transmission device for antenna switching configuration provided in the embodiments of the present disclosure includes hardware structures and/or software modules for performing the various corresponding functions. In combination with the units and algorithm steps of the examples disclosed in the embodiments of the present disclosure, the embodiments of the present disclosure can be implemented in the form of hardware or a combination of hardware and computer software. Whether a function is performed by hardware or computer software driving the hardware depends on the specific application and design constraints of the technical solution. Those skilled in the art can use different methods to implement the described functions for each specific application, but such implementation should not be considered to go beyond the scope of the technical solutions of the embodiments of the present disclosure.

Figure 7:
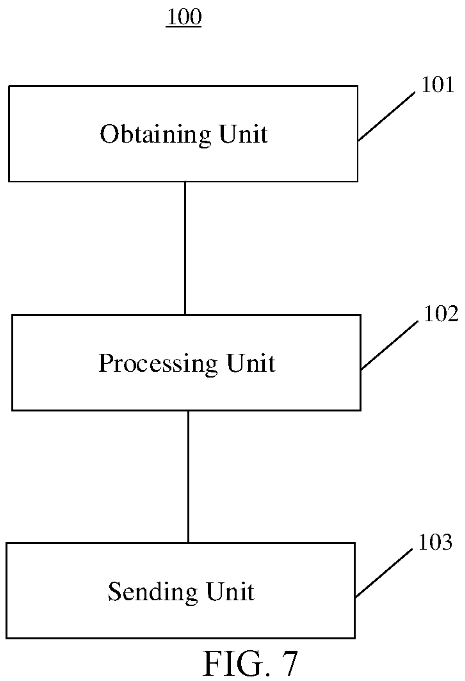
FIG. 7 is a block diagram of an SRS transmission device for antenna switching configuration according to an illustrative embodiment.

FIG. 7 is a block diagram of an SRS transmission device for antenna switching configuration according to an illustrative embodiment. Referring to FIG. 7, the SRS transmission device 100 for antenna switching configuration is applied to a terminal and includes an obtaining unit 101, a processing unit 102 and a sending unit 103.

The obtaining unit 101 is configured to obtain indication information. The indication information is used to indicate antenna switching configuration related information. The antenna switching configuration related information includes one or a combination of the following: a transmitting antenna used for a SRS corresponding to a target antenna switching configuration, a transmitting antenna port used for the SRS corresponding to the target antenna switching configuration, the target antenna switching configuration, and SRS resources corresponding to the target antenna switching configuration. The processing unit 102 is configured to determine a target SRS resource for sending the target antenna switching configuration based on the indication information. The sending unit 103 is configured to send the SRS of the target antenna switching configuration according to the target SRS resource.

In an implementation, the processing unit 102 is configured to determine the target SRS resource for sending the target antenna switching configuration based on the indication information by: determining a target SRS resource set in first SRS resource sets, where the target SRS resource set includes one or more SRS resources corresponding to the antenna switching configuration supported by the terminal, the first SRS resource sets are a plurality of SRS resource sets corresponding to different antenna switching configurations configured by the network for the terminal, and the SRS resource set corresponding to each of the antenna switching configurations includes one or more SRS resources; and determining the target SRS resource for sending the target antenna switching configuration in the target SRS resource set based on the indication information.

In an implementation, the terminal is a terminal that supports transmitting antenna switching. The indication information indicates to adjust a current antenna switching configuration to the target transmitting antenna or target transmitting antenna port used for the SRS corresponding to the target antenna switching configuration.

In an implementation, the terminal is a terminal that supports switching of transmitting antennas and/or receiving antennas. The indication information indicates the target transmitting antenna or target transmitting antenna port used for the SRS corresponding to the target antenna switching configuration. Or the indication information indicates the target antenna switching configuration.

In an implementation, the indication information is used to indicate the target transmitting antenna or target transmitting antenna port used for the SRS corresponding to the target antenna switching configuration.

In an implementation, the indication information includes at least one of a bitmap, an index and a codepoint corresponding to the target transmitting antenna or the target transmitting antenna port.

In an implementation, the indication information indicates SRS resources corresponding to the target antenna switching configuration, where the SRS resources belong to one or more SRS resource sets.

In an implementation, the indication information includes at least one of a bitmap, an index and a codepoint corresponding to the SRS resources corresponding to the target antenna switching configuration.

In an implementation, the processing unit 102 is configured to determine the target SRS resource for sending the target antenna switching configuration based on the indication information by: determining a target SRS resource set in a second SRS resource set. The second SRS resource set is a set of SRS resources corresponding to antenna switching configurations including all transmitting antennas or transmitting ports supported by the terminal, or the second SRS resource set is a set of SRS resources corresponding to multiple different antenna switching configurations supported by the terminal. The target SRS resource for sending the target antenna switching configuration is determined in the target SRS resource set based on the indication information.

In an implementation, the sending unit 103 is configured to send the SRS corresponding to the target antenna switching configuration by:

activating and sending the SRS corresponding to the target antenna switching configuration, or determining and sending the SRS resources corresponding to the target antenna switching configuration based on received R RC signaling, or switching to a bandwidth part including the target SRS resource, and sending the SRS corresponding to the target antenna switching configuration.

In an implementation manner, the indication information includes at least one of the following: a media access control-control element, downlink control information, grant controller downlink control information, and radio resource control information.

In an implementation, the sending unit 103 is further configured to report antenna switching configuration information, where the antenna switching configuration information is used to indicate one or a combination of the following: a target antenna switching configuration expected by the terminal, a transmitting antenna configuration or transmitting antenna port configuration expected by the terminal, and a SRS resource configuration expected by the terminal.

In an implementation, the sending unit 103 is configured to report the antenna switching configuration information based on at least one of a media access control-control element, uplink control information, grant controller uplink control information, and radio resource control information.

In an implementation, the SRS corresponding to the target antenna switching configuration includes one or more of a periodic SRS, an aperiodic SRS, and a semi-persistent SRS.

Figure 8:
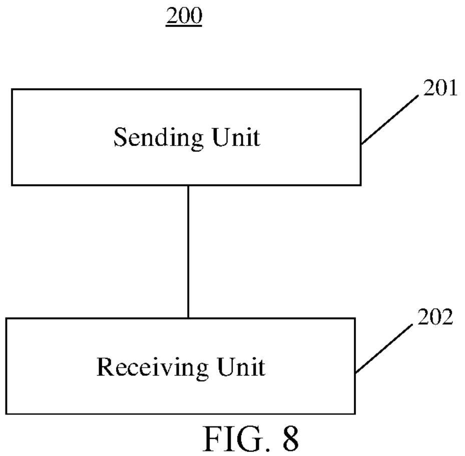
FIG. 8 is a block diagram of an SRS transmission device for antenna switching configuration according to an illustrative embodiment.

FIG. 8 is a block diagram of an SRS transmission device for antenna switching configuration according to an illustrative embodiment. Referring to FIG. 8, the SRS transmission device 200 for antenna switching configuration is applied to a network device and includes a sending unit 201 and a receiving unit 202.

The sending unit 201 is configured to send indication information. The indication information is used to indicate antenna switching configuration related information. The antenna switching configuration related information includes one or a combination of the following: a transmitting antenna used for a SRS corresponding to a target antenna switching configuration, a transmitting antenna port used for the SRS corresponding to the target antenna switching configuration, the target antenna switching configuration, and SRS resources corresponding to the target antenna switching configuration. The receiving unit 202 is configured to receive the SRS of the target antenna switching configuration.

In an implementation, the indication information indicates to adjust the current antenna switching configuration to the target transmitting antenna or target transmitting antenna port used for the SRS corresponding to the target antenna switching configuration.

In an implementation, the indication information indicates the target transmitting antenna or target transmitting antenna port used for the SRS corresponding to the target antenna switching configuration. Or the indication information indicates the target antenna switching configuration.

In an implementation, the indication information is used to indicate the target transmitting antenna or target transmitting antenna port used for the SRS corresponding to the target antenna switching configuration.

In an implementation, the indication information includes at least one of a bitmap, an index and a codepoint corresponding to the target transmitting antenna or the target transmitting antenna port.

In an implementation, the indication information indicates SRS resources corresponding to the target antenna switching configuration, where the SRS resources belong to one or more SRS resource sets.

In an implementation, the indication information includes at least one of a bitmap, an index and a codepoint corresponding to the SRS resources corresponding to the target antenna switching configuration.

In an implementation, the sending unit 201 is further configured to send radio resource control RRC signaling, which indicates the SRS resources corresponding to the target antenna switching configuration.

In an implementation, the indication information includes at least one of the following: a media access control-control element, downlink control information, grant controller downlink control information, and radio resource control information.

In an implementation, the receiving unit 202 is further configured to: obtain antenna switching configuration information reported by the terminal, where the antenna switching configuration information is used to indicate one or a combination of the following:

a target antenna switching configuration expected by the terminal, a transmitting antenna configuration or transmitting antenna port configuration expected by the terminal, and a SRS resource configuration expected by the terminal.

In an implementation, the receiving unit 202 obtains the antenna switching configuration information reported by the terminal based on at least one of a media access control-control element, uplink control information, grant controller uplink control information, and radio resource control information.

In an implementation, the SRS corresponding to the target antenna switching configuration includes one or more of a periodic SRS, an aperiodic SRS, and a semi-persistent SRS.

Regarding the devices in the above embodiments, the specific manner in which the various modules perform operations has been described in detail in the embodiments related to the method, and will not be described in detail here.

Figure 9:
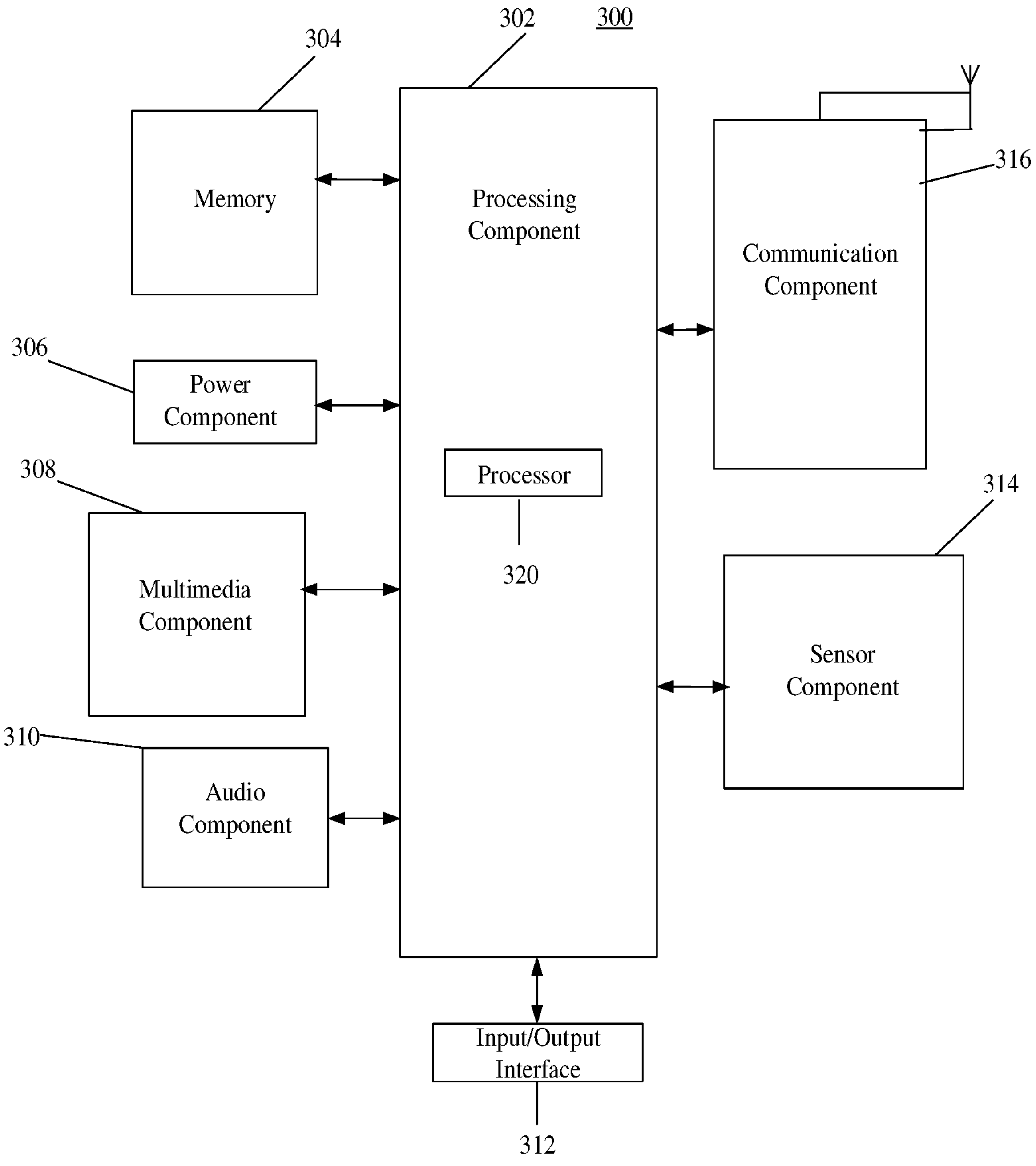
FIG. 9 is a block diagram of an SRS transmission device for antenna switching configuration according to an illustrative embodiment.

FIG. 9 is a block diagram of an SRS transmission device for antenna switching configuration according to an illustrative embodiment. For example, the device 300 may be a mobile phone, a computer, a digital broadcast terminal, a messaging device, a game console, a tablet device, a medical device, a fitness device, a personal digital assistant, or the like.

Referring to FIG. 9, the device 300 may include one or more of the following components: a processing component 302, a memory 304, a power component 306, a multimedia component 308, an audio component 310, an input/output (I/O) interface 312, a sensor component 314, and a communication component 316.

The processing component 302 generally controls the overall operations of device 300, such as operations associated with display, phone calls, data communications, camera operations, and recording operations. The processing component 302 may include one or more processors 320 to execute instructions to complete all or part of the steps of the above methods. Additionally, the processing component 302 may include one or more modules that facilitate interaction between processing component 302 and other components. For example, processing component 302 may include a multimedia module to facilitate interaction between multimedia component 308 and processing component 302.

The memory 304 is configured to store various types of data to support operations at the device 300. Examples of such data include instructions for any application or method operating on the device 300, contact data, phonebook data, messages, pictures, videos, etc. The memory 304 may be implemented by any type of volatile or non-volatile storage device, or a combination thereof, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk or an optical disk.

The power component 306 provides power to the various components of device 300. The power components 306 may include a power management system, one or more power supplies, and other components associated with generating, managing, and distributing power for the device 300.

The multimedia component 308 includes a screen that provides an output interface between the device 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundary of a touch or slide action, but also detect the duration and pressure associated with the touch or slide action. In some embodiments, the multimedia component 308 includes a front-facing camera and/or a rear-facing camera. When the device 300 is in an operating mode, such as a shooting mode or a video mode, the front-facing camera and/or the rear-facing camera may receive external multimedia data. Each of the front-facing camera and rear-facing camera can be a fixed optical lens system or have a focal length and optical zoom capabilities.

The audio component 310 is configured to output and/or input audio signals. For example, the audio component 310 includes a microphone (MIC) configured to receive external audio signals when the device 300 is in operating modes, such as call mode, recording mode, and voice recognition mode. The received audio signals may be further stored in the memory 304 or sent via the communication component 316. In some embodiments, the audio component 310 also includes a speaker for outputting audio signals.

The I/O interface 312 provides an interface between the processing component 302 and a peripheral interface module, which may be a keyboard, a click wheel, a button, etc. These buttons may include, but are not limited to a home button, a volume button, a start button, and a lock button.

The sensor component 314 includes one or more sensors for providing status assessment of various aspects for device 300. For example, the sensor component 314 can detect the open/closed state of the device 300, and the relative positioning of components, such as the display and keypad of the device 300, and the sensor component 314 can also detect a change in position of the device 300 or a component of the device 300, the presence or absence of user contact with device 300, orientation or acceleration/deceleration of the device 300 and temperature changes of the device 300. The sensor component 314 may include a proximity sensor configured to detect the presence of a nearby object without any physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as Wi-Fi, 2G or 3G, or a combination thereof. In an illustrative embodiment, the communication component 316 receives broadcast signals or broadcast related information from an external broadcast management system via a broadcast channel. In an illustrative embodiment, the communication component 316 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an illustrative embodiment, the device 300 may be configured by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic component implementations for performing the above method.

In an illustrative embodiment, there is also provided a non-transitory computer-readable storage medium including instructions, such as a memory 304 including instructions, which can be executed by the processor 320 of the device 300 to complete the above methods. For example, the non-transitory computer-readable storage medium may be a ROM, a random access memory (RAM), a CD-ROM, a magnetic tape, a floppy disk, an optical data storage device, etc.

Figure 10:
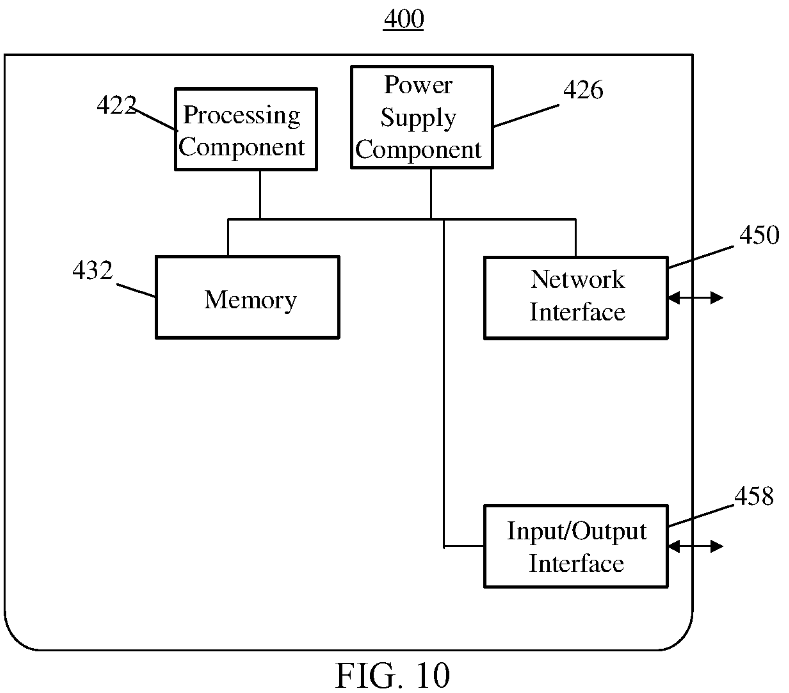
FIG. 10 is a block diagram of an SRS transmission device for antenna switching configuration according to an illustrative embodiment.

FIG. 10 is a block diagram of an SRS transmission device for antenna switching configuration according to an illustrative embodiment. For example, the device 400 may be provided as a network device. Referring to FIG. 10, the device 400 includes a processing component 422, which further includes one or more processors, and memory resources represented by a memory 432 for storing instructions, such as application programs, executable by processing component 422. The application program stored in the memory 432 may include one or more modules, each corresponding to a set of instructions. Furthermore, the processing component 422 is configured to execute instructions to perform the above-described methods.

The device 400 may also include a power supply component 426 configured to perform power management of the device 400, a wired or wireless network interface 450 configured to connect the device 400 to a network, and an input-output (I/O) interface 458. The device 400 may operate based on an operating system stored in the memory 432, such as Windows Server™, Mac OS X™, Unix™, Linux™, FreeBSD™ or the like.

In an illustrative embodiment, there is also provided a non-transitory computer-readable storage medium including instructions, such as a memory 432 including instructions, which are executable by the processing component 422 of the device 400 to complete the above methods. For example, the non-transitory computer-readable storage medium may be a ROM, a random access memory (RAM), a CD-ROM, a magnetic tape, a floppy disk, an optical data storage device, etc.

The technical solution provided in the embodiments of the present disclosure can include the following beneficial effects. The terminal obtains indication information that indicates antenna switching configuration-related information, where the antenna switching configuration-related information includes one or a combination of a transmitting antenna used for a SRS corresponding to a target antenna switching configuration, a transmitting antenna port used for the SRS corresponding to the target antenna switching configuration, the target antenna switching configuration, and SRS resources corresponding to the target antenna switching configuration. Based on the indication information, the terminal determines the target SRS resource for sending the target antenna switching configuration, and sends the SRS of the target antenna switching configuration according to the determined target SRS resource, thereby realizing dynamic switching of the antenna switching configuration.

It can be further understood that "a plurality of" in the present disclosure refers to two or more, and other quantifiers are similar. "And/or" describes the relationship between associated objects, indicating that there can be three relationships. For example, A and/or B can represent that A exists alone, A and B exist simultaneously, and B exists alone. The character "/" generally indicates that the related objects are in an "or" relationship. The singular forms of "a", "an" and "the" are intended to include the plural forms as well, unless the context clearly indicates otherwise.

It is further understood that the terms "first", "second", etc. are used to describe various information, but such information should not be limited to these terms. These terms are only used to distinguish information of the same type from each other and do not imply a specific order or importance. In fact, expressions such as "first" and "second" can be used interchangeably. For example, without departing from the scope of the present disclosure, the first information may also be called second information, and similarly, the second information may also be called first information.

It can be further understood that although the operations are described in a specific order in the drawings in the embodiments of the present disclosure, this should not be understood as requiring that these operations be performed in the specific order shown or in a serial order, or requiring that all operations shown be performed to obtain the desired results. In certain circumstances, multitasking and parallel processing may be advantageous.

Other embodiments of the present disclosure will be readily apparent to those skilled in the art from consideration of the specification and practice of the present disclosure disclosed herein. The present disclosure is intended to cover any variations, uses, or adaptations of the present disclosure that follow the general principles of the present disclosure and include common knowledge or conventional technical means in the technical field that are not disclosed in the present disclosure. It is intended that the specification and examples be considered as exemplary only, with a true scope and spirit of the present disclosure being indicated by the following claims.

It is to be understood that the present disclosure is not limited to the precise structures described above and illustrated in the accompanying drawings, and various modifications and changes may be made without departing from the scope thereof. The scope of the present disclosure is limited only by the appended claims.

What is claimed is:

1. An SRS transmission method for antenna switching configuration, the method being applied to a terminal that supports transmitting antenna switching and does not support receiving antenna switching, and the method comprising:

reporting antenna switching configuration information, the antenna switching configuration information indicating at least one of: a transmitting antenna configuration or transmitting antenna port configuration expected by the terminal; or an SRS resource configuration expected by the terminal;

obtaining indication information, the indication information indicating to adjust a current antenna switching configuration to a target transmitting antenna used for an SRS corresponding to a target antenna switching configuration, or a target transmitting antenna port used for the SRS corresponding to the target antenna switching configuration, and the indication information comprising at least one of a bitmap, an index or a codepoint that correspond to the target transmitting antenna or the target transmitting antenna port;

determining, based on the indication information, a target SRS resource for sending the SRS corresponding to the target antenna switching configuration; and sending the SRS corresponding to the target antenna switching configuration according to the target SRS resource.

2. The SRS transmission method for antenna switching configuration according to claim 1, wherein the determining, based on the indication information, the target SRS resource for sending the SRS corresponding to the target antenna switching configuration comprises:

determining a target SRS resource set in first SRS resource sets, wherein the target SRS resource set comprises one or more SRS resources corresponding to an antenna switching configuration supported by the terminal, the first SRS resource sets are a plurality of SRS resource sets configured by a network for the terminal that correspond to different antenna switching configurations, and the SRS resource set corresponding to each of the antenna switching configurations comprises one or more SRS resources; and determining the target SRS resource for sending the SRS corresponding to the target antenna switching configuration in the target SRS resource set based on the indication information.

3. The SRS transmission method for antenna switching configuration according to claim 1, wherein the sending the SRS corresponding to the target antenna switching configuration comprises:

activating and sending the SRS corresponding to the target antenna switching configuration; or determining and sending the SRS resources corresponding to the target antenna switching configuration based on received RRC signaling; or switching to a bandwidth part comprising the target SRS resource, and sending the SRS corresponding to the target antenna switching configuration.

4. The SRS transmission method for antenna switching configuration according to claim 1, wherein the indication information comprises at least one of the following:

a media access control-control element, downlink control information, grant controller downlink control information, and radio resource control information.

5. The SRS transmission method for antenna switching configuration according to claim 1, wherein the reporting the antenna switching configuration information comprises:

reporting the antenna switching configuration information based on at least one of a media access control-control element, uplink control information, grant controller uplink control information, and radio resource control information.

6. The SRS transmission method for antenna switching configuration according to claim 1, wherein the SRS corresponding to the target antenna switching configuration comprises one or more of a periodic SRS, an aperiodic SRS and a semi-persistent SRS.

7. An SRS transmission method for antenna switching configuration, the method being applied to a network device and comprising:

receiving antenna switching configuration information reported by a terminal, the antenna switching configuration information indicating at least one of: a transmitting antenna configuration or transmitting antenna port configuration expected by the terminal; or an SRS resource configuration expected by the terminal, wherein the terminal supports transmitting antenna switching and does not support receiving antenna switching;

sending indication information, the indication information indicating to adjust a current antenna switching configuration to a target transmitting antenna used for an SRS corresponding to a target antenna switching configuration, or a target transmitting antenna port used for the SRS corresponding to the target antenna switching configuration, and the indication information comprising at least one of a bitmap, an index or a codepoint that correspond to the target transmitting antenna or the target transmitting antenna port; and receiving the SRS corresponding to the target antenna switching configuration.

8. The SRS transmission method for antenna switching configuration according to claim 7, further comprising:

sending radio resource control (RRC) signaling, wherein the RRC signaling indicates SRS resources corresponding to the target antenna switching configuration.

9. The SRS transmission method for antenna switching configuration according to claim 7, wherein the SRS corresponding to the target antenna switching configuration comprises one or more of a periodic SRS, an aperiodic SRS and a semi-persistent SRS.

10. A terminal that supports transmitting antenna switching and does not support receiving antenna switching, comprising:

a processor; and a memory configured to store instructions executable by the processor;

wherein the processor is configured to:

report antenna switching configuration information, the antenna switching configuration information indicating at least one of: a transmitting antenna configuration or transmitting antenna port configuration expected by the terminal; and an SRS resource configuration expected by the terminal;

obtain indication information, the indication information indicating ante to adjust a current antenna switching configuration to a target transmitting antenna used for an SRS corresponding to a target antenna switching configuration, or a target transmitting antenna port used for the SRS corresponding to the target antenna switching configuration, and the indication information comprising at least one of a bitmap, an index or a codepoint that correspond to the target transmitting antenna or the target transmitting antenna port;

determine, based on the indication information, a target SRS resource for sending the SRS corresponding to the target antenna switching configuration; and send the SRS corresponding to the target antenna switching configuration according to the target SRS resource.

11. A network device, comprising:

a processor; and a memory configured to store instructions executable by the processor;

wherein the processor is configured to perform the SRS transmission method for antenna switching configuration according to claim 7.

12. A non-transitory storage medium having stored thereon instructions which, when being executed by a processor of a terminal, cause the terminal to perform the SRS transmission method for antenna switching configuration according to claim 1.

* * * * *